United States Patent [19] [11] Patent Number: 4,724,607
Beuneche et al. [45] Date of Patent: Feb. 16, 1988

[54] APPARATUS FOR REBUILDING NUCLEAR FUEL ASSEMBLIES

[75] Inventors: Daniel Beuneche, Collonges au Mont d'Or; Pierre Amier, Condrieu, both of France

[73] Assignee: Fragema, Courbevoie, France

[21] Appl. No.: 658,012

[22] Filed: Oct. 5, 1984

[30] Foreign Application Priority Data

Oct. 11, 1983 [FR] France ................... 83 16145

[51] Int. Cl.⁴ .............................................. B23P 19/04
[52] U.S. Cl. .................................. 29/723; 29/402.08; 376/271; 376/272
[58] Field of Search ............... 29/401.1, 402.1, 402.03, 29/402.08, 426.3, 723; 376/272, 271, 261

[56] References Cited

U.S. PATENT DOCUMENTS 2,949,202  8/1960  Treshow ........................... 376/271
3,039,949  6/1962  Newton et al. .................... 376/271
3,044,947  7/1962  Payne, Jr. ...................... 376/271 X
4,175,318 11/1979  Matsuura et al. ................... 29/723
4,311,557  1/1982  Kowalski et al. ................. 376/271
4,446,098  5/1984  Pomaibo et al. ............... 376/272 X
4,474,398 10/1984  Tolino et al. ................. 376/261 X
4,547,117 10/1985  Shields et al. ................ 376/272 X

FOREIGN PATENT DOCUMENTS 2264383  9/1973  Fed. Rep. of Germany ...... 376/272

OTHER PUBLICATIONS

"Repairing Fuel for Reinsertion", Jul. 1985.

Primary Examiner—Howard N. Goldberg
Assistant Examiner—Joseph M. Gorski

[57] ABSTRACT

The apparatus is intended for rebuilding an assembly comprising a skeleton formed by two end members connected by tie rods attached to the end members and grids distributed between the end members along the tie rods and adapted to retain a cluster of fuel rods trapped between the end members. The apparatus comprises a first chamber (AI) for receiving a fuel assembly, a second chamber (AS) for receiving a new skeleton, a repair station comprising a lift adapted to receive the two vertically disposed aligned chambers and to bring the chambers to a level such that there subsists a layer of protective water above the rods, a transfer tool (106) to draw one fuel rod at a time into the skeleton from the assembly contained in the first chamber, and means for mounting the end members on the skeleton.

9 Claims, 27 Drawing Figures

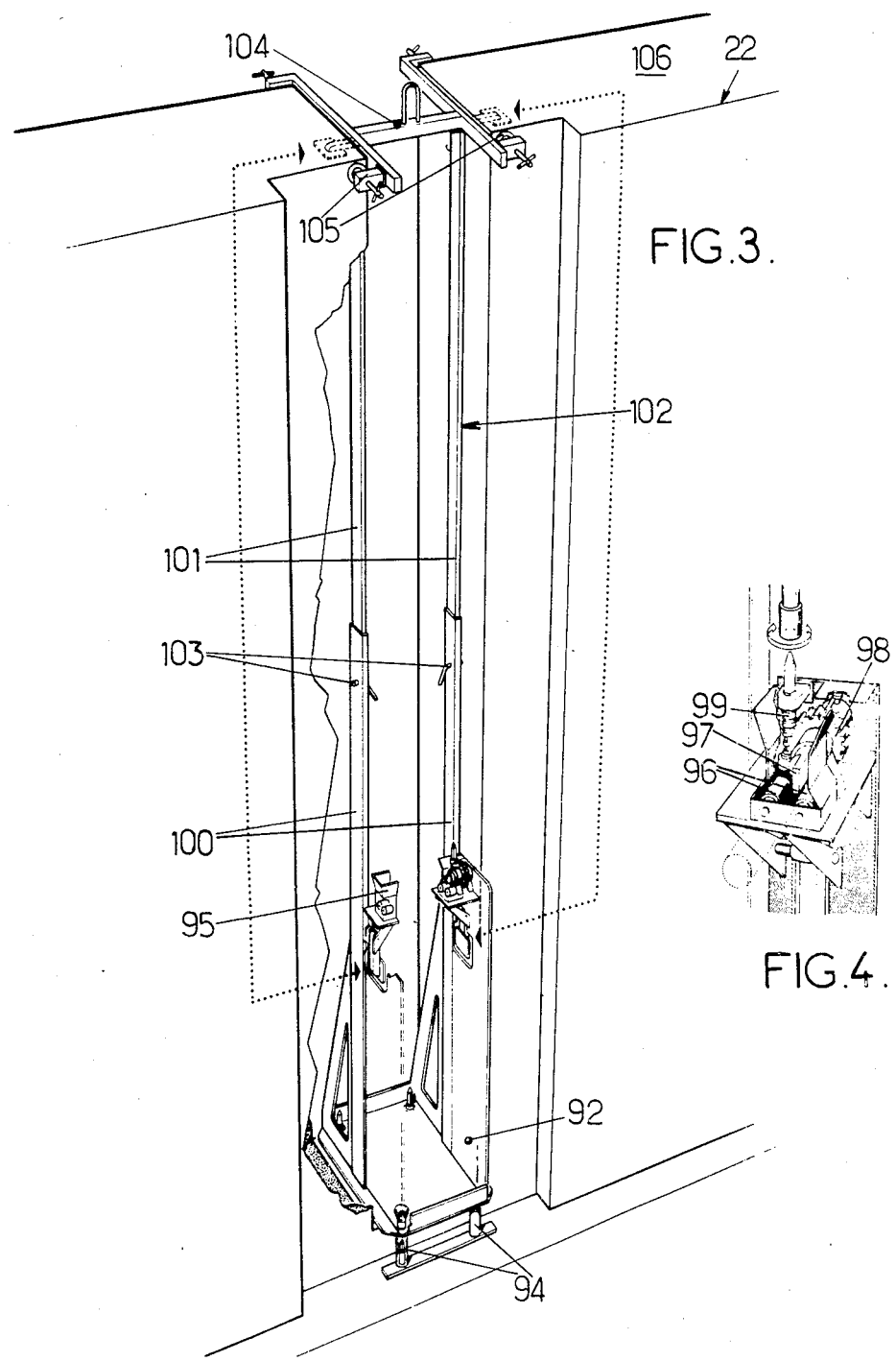

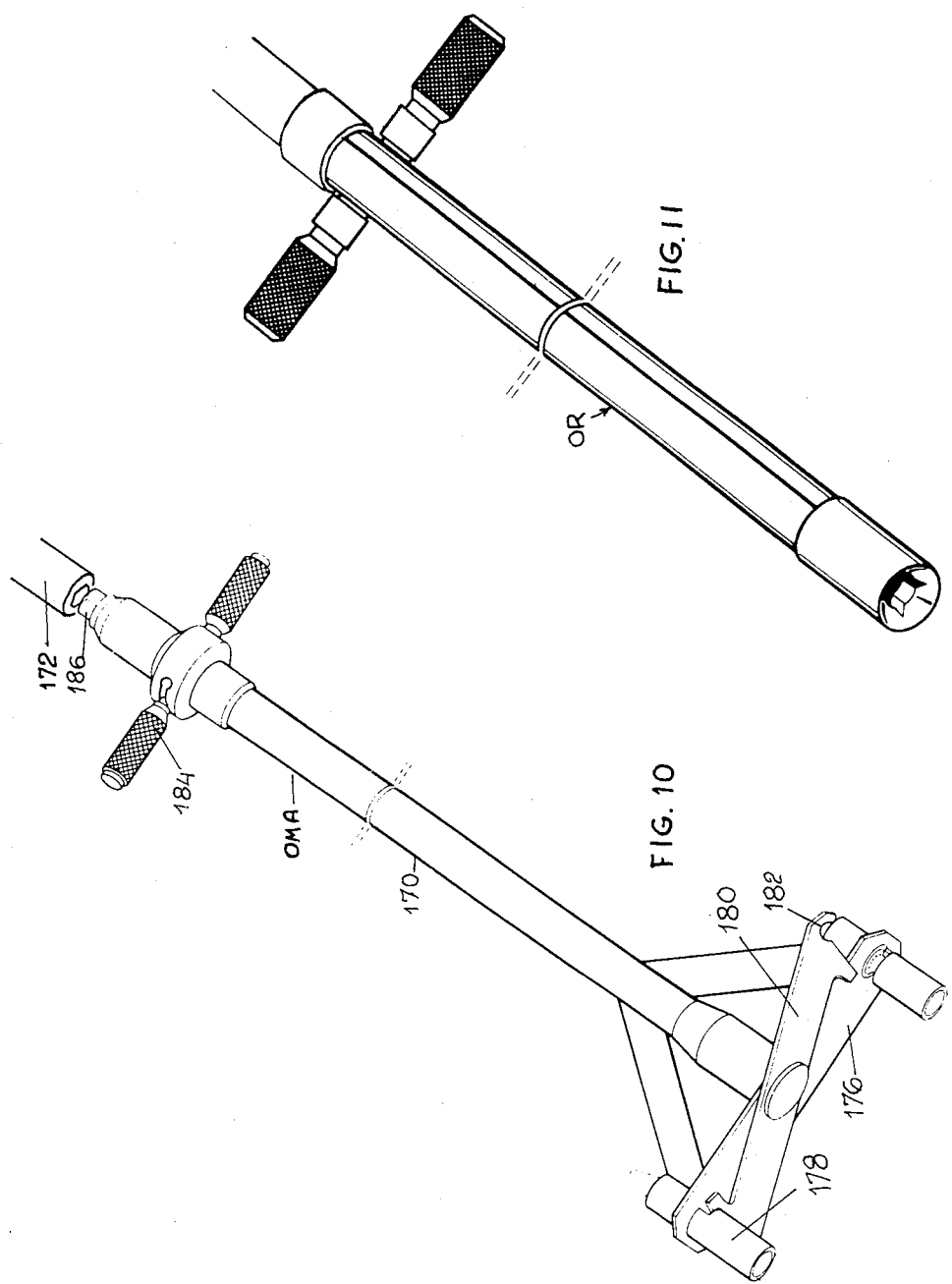

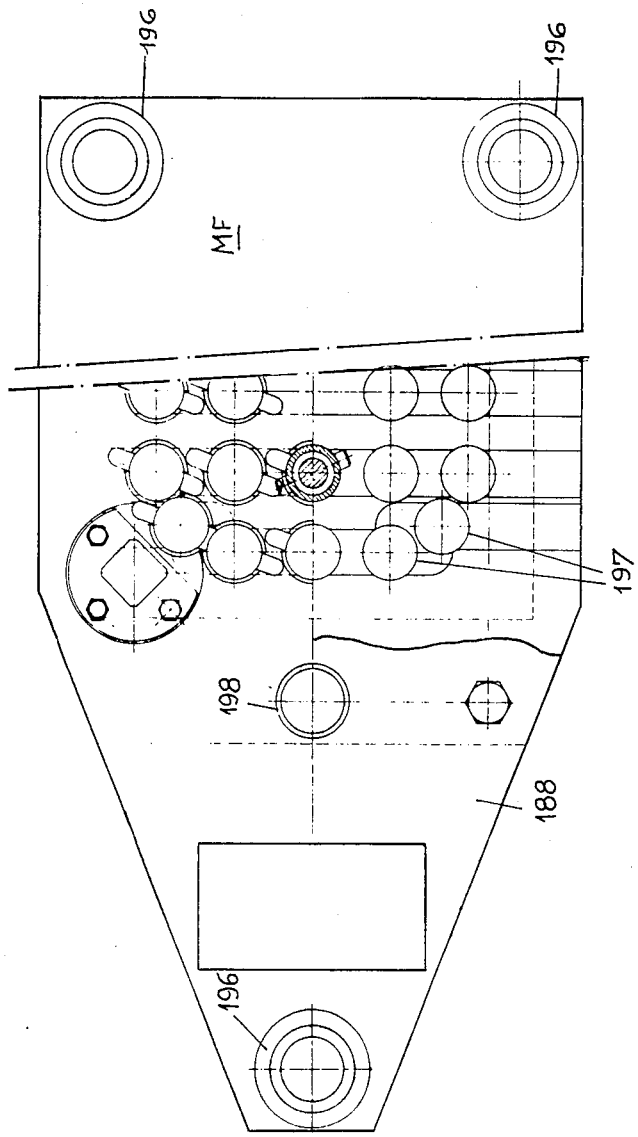

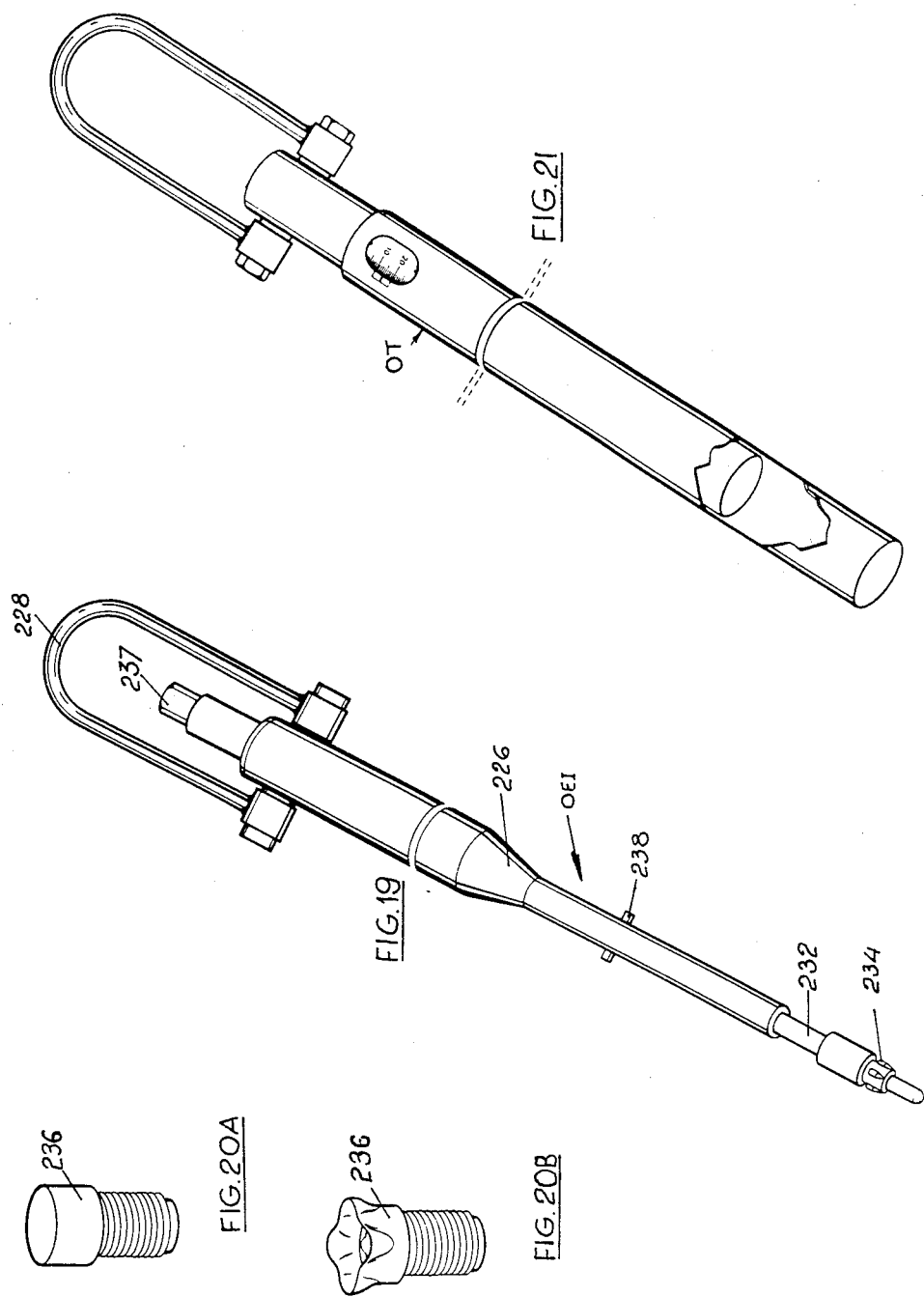

APPARATUS FOR REBUILDING NUCLEAR FUEL ASSEMBLIES

BACKGROUND AND SUMMARY OF THE INVENTION

The invention relates to the rebuilding of nuclear fuel assemblies of the kind which comprises a skeleton formed by two end members connected by tie rods attached to the end members and grids distributed between the end members along the tie rods and adapted to maintain a cluster of fuel rods trapped between the end members.

Assemblies of the kind specified are used almost universally in natural water cooled and moderated reactors, more particularly in pressurized water reactors. In some cases an assembly has to be removed and some or all the rods which it contains removed. This situation arises more particularly when the elements of the skeleton of an assembly have become so damaged that an assembly must be rebuilt by removing the rods and replacing them in a new skeleton. Another situation is one in which some or all the rods of an assembly are to be transferred to a new assembly in a different arrangement, or associating the rods with new or different rods (for example, to associate rods containing uranium oxide with rods containing a neutron absorbent, an inert material or a plutonium-enriched fuel). Yet another situation is that in which an assembly modifying the moderating rate is to be constructed.

Different methods of connecting the elements forming the skeleton have been proposed. In the majority of the assemblies at present in operation the tie rods are non-releasably attached to the upper end member and are attached to the lower end member via means enabling the latter to be removed. Some of the assemblies belonging to this group use attachment by a screwthreaded socket which is locked in place by a pin; others use attachment by a screwthreaded socket having a skirt which is subsequently deformed to prevent the socket from rotating. Reference can be made, for example, to French patent application No. 2 521 763 for a description of an assembly of this kind.

In contrast, another group of assemblies, described in French patent application No. 2,536,261, comprises a removable upper end member; this method has the advantage of eliminating the need for tilting the assembly through 180° between its stored position and the position in which the rods are removed.

It is more particularly an object of the invention to provide a method and apparatus which enable a nuclear fuel assembly to be rebuilt by transferring fuel rods taken from an existing, generally heavily irradiated and often damaged assembly to a new skeleton, while using only simple means and limiting the risk of error or breakdown. Another object of the invention is to provide a method and apparatus which is very flexible to use and can more particularly be adapted to the various groups of fuel assemblies mentioned hereinbefore.

To this end the invention provides more particularly a method for rebuilding an assembly of the type hereinbefore defined, wherein the assembly whose fuel rods are to be extracted is disposed in a first vertical chamber, the detachable end member of such assembly being directed upwards; the detachable end member is removed; a second chamber containing and retaining a new assembly skeleton is moved above the end chamber in the same orientation as the assembly of the first chamber and in alignment therewith; the rods to be extracted from the assembly are drawn into the skeleton; and the skeleton is completed by putting the end members in place.

If only the lower end member of the assembly is detachable, the assembly is first placed in the normal position in the first chamber and is blocked in position therein; the chamber is turned over; the new skeleton is moved into an inverted position in its chamber to enable the rods to be extracted from the assembly contained in the first chamber to be drawn upwards towards the skeleton.

As a general rule the two chambers rest on one another via a retaining and centring mask.

It is found that this method of procedure simplifies the handling of the rods and moreover almost completely eliminates the risk of introducing a rod into unaligned passages in the grids of the new skeleton, since the grab which must be lowered through the grids of the new assembly to seize the rods to be drawn upwards ensures guidance.

The new skeleton can have new rods of fissile, fertile, inert or absorbent material which will contribute towards guiding the fuel rods as they rise.

In an advantageous embodiment of the invention the method allows the rebuilding, from a fuel assembly of the kind only the lower end member of which can be removed, of an assembly provided to enable the rods to be extracted after the removal of the upper end member—i.e., an assembly which can be repaired by the use of the apparatus disclosed in French patent application No. 2,536,261.

This procedure begins with a sequence of operations which remains the same, whatever the nature of the assembly of the new skeleton may be. The damaged assembly is deposited in a lower chamber placed in a pool of water and is immobilised in such chamber; the chamber is turned over through 180°; the chamber is lifted in the pool, while remaining submerged, to a level such that a lower plug of the chamber can be removed and a guide mask put in place; the means for attaching the lower end member of the damaged assembly are eliminated, for instance, by cutting off the pin and then removing screws in the case of a usual kind of assembly; the lower chamber containing the assembly without its lower end member is lowered into the bottom position in the pool; an upper chamber, into which a new skeleton without its end members and disposed in the inverted position has already been placed and immobilised, is moved above the lower chamber and aligned therewith; a tool for transferring the rods is positioned above the chamber, and a grab with which it is equipped is lowered through the skeleton to the level of the rod to be extracted and then actuated to seize the rod and lifted into the skeleton, where the rod is released the; operations are repeated until all the rods have been transferred; the lower end member of the new skeleton is fixed; the upper chamber can then be withdrawn and turned over, before its upper end member is put in place.

Once the skeleton of the damaged assembly has been emptied, the operation can be completed by the replacement of the lower end member before removal.

The invention also relates to an apparatus for enabling the process defined hereinbefore to be put into effect, such apparatus advantageously also including means for repairing an assembly in which certain rods are to be replaced, so as to widen the field of use of the apparatus.

The invention will be more clearly understood from the following description of an example of an apparatus forming a particular embodiment of the invention and of the method put into effect in such apparatus. The description refers to the accompanying drawings.

BRIEF DESCRIPTION OF THE DRAWINGS

FIGS. 3 and 4 show respectively a perspective view of a tilting device associated with the apparatus and a detail of such device;

FIGS. 10 and 11 show respectively in perspective a chamber handling tool and a position adjustment tool which can be used in the apparatus shown in FIG. 2;

FIG. 15 is a plan view of the milling mask cooperating with the tool shown in FIGS. 12 to 14.

FIG. 19 is a perspective view of a tool for expanding the skirt of a screw or screwthreaded socket which can be used in the apparatus shown in FIG. 2.

FIGS. 20A and 20B are perspective views showing the skirt of the screw, before and after expansion respectively.

FIG. 21, similar to FIG. 19, shows a measuring tool which can be used in the apparatus shown in FIG. 2, and FIGS. 22A, 22B and 22C show diagrammatically the successive stages of putting a method according to the invention into effect.

Before describing the apparatus according to the invention, we shall briefly recall how a fuel assembly to which it is applicable is constructed.

DESCRIPTION OF A PREFERRED EMBODIMENT

Figure 1:
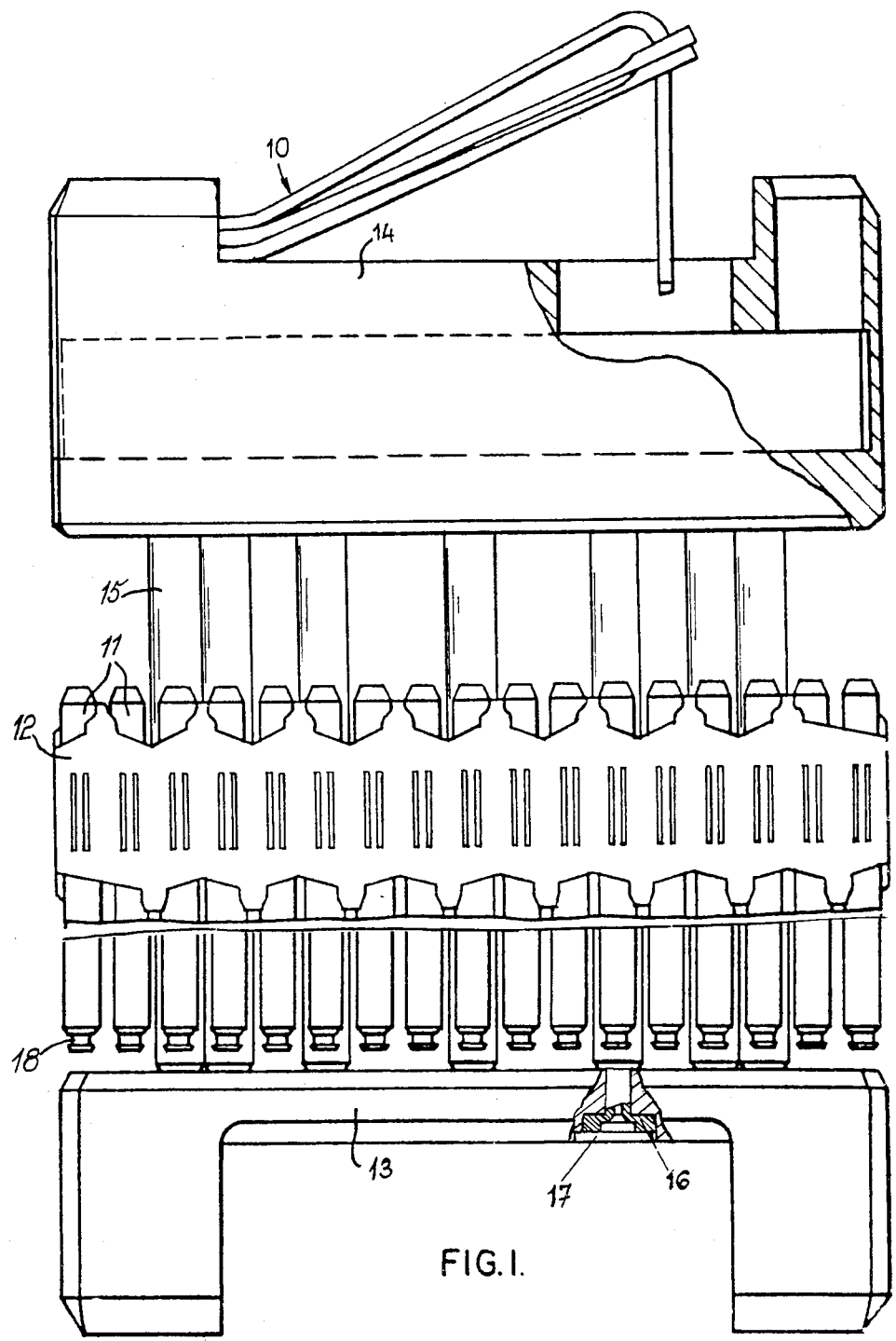
FIG. 1 is a simplified view of a fuel assembly for a light water reactor of the current type, in elevation and partly sectioned.

The assembly 10 shown in FIG. 1 comprises a cluster of fuel rods 11 retained by spacer grids 12 distributed along the cluster. The grids 12 define passages through the majority of which fuel rods 11 extend while extending through the others are tie rods 15 attached to a lower end member 13 and an upper end member 14 whose upper part has a shape enabling it to be seized by a handling tool. In a conventional fuel assembly the tie rods 15, formed by guide tubes enabling elements outside the assembly to slide therein, are permanently attached to the upper end member. They are attached to the lower end member by screwthreaded sockets 16 immobilised by transverse pins 17. Only the lower plug of the rods 11 is formed with a gripping circumferential groove 18 in such a conventional assembly.

In contrast, in recent assemblies the tie rods 15 are attached to the upper end member 14 by removable means formed by sockets having a screwthreaded lower portion adapted to be screwed into the lower portion of a tie rod and a head bearing against the end member 14.

The apparatus which will now be described more particularly enables a fuel assembly to be rebuilt by extracting fuel rods contained in a damaged assembly and introducing them into a new skeleton, while the elements having high radioactivity remain submerged in the water at an adequate depth to ensure the biological protection of the operators.

Figure 2:
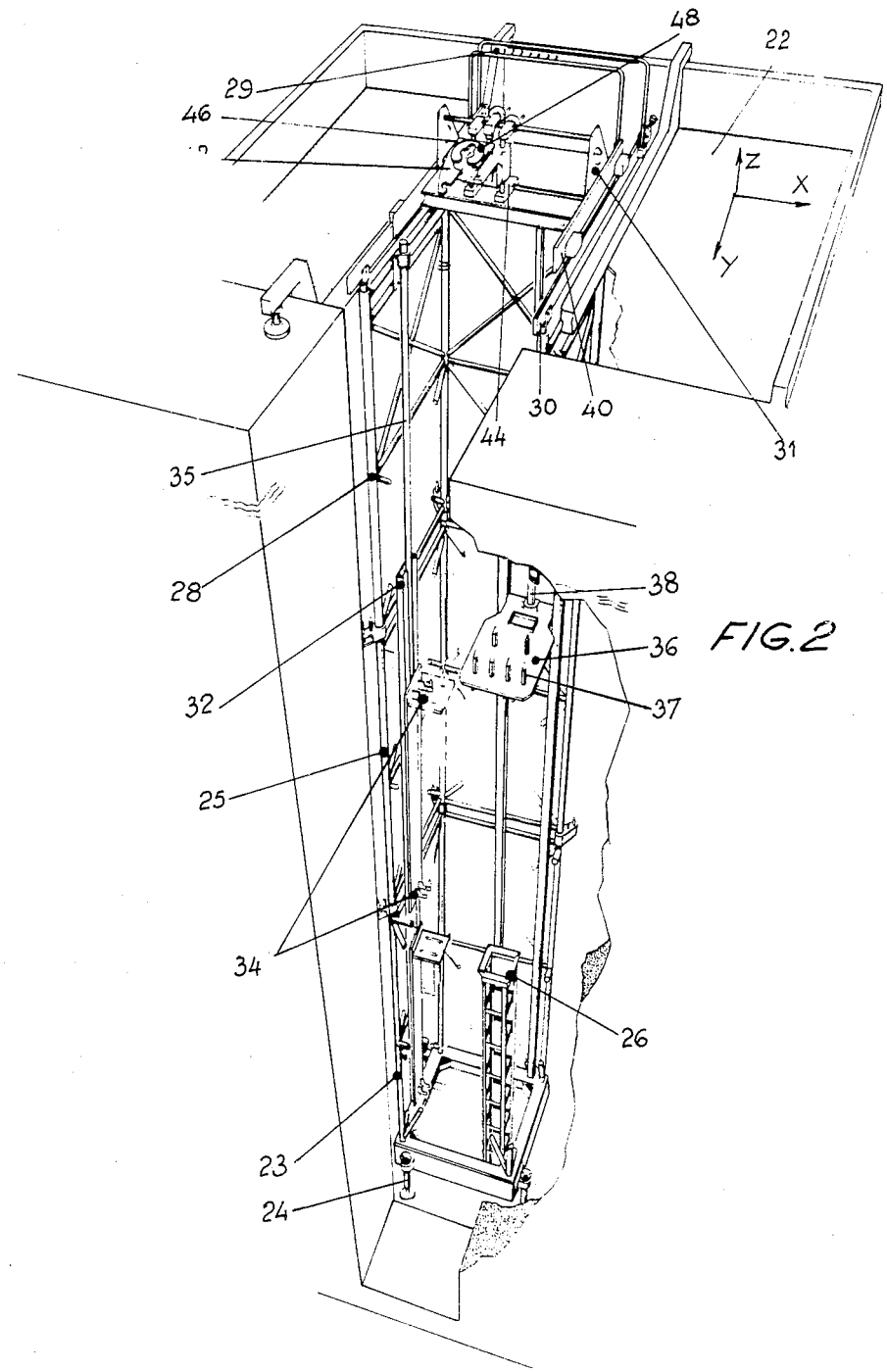
FIG. 2 is a simplified perspective view from above of the repair station of an apparatus according to the invention.

In practice the apparatus will in general be mounted on the evacuation pool of the exhausted fuel unloaded from a nuclear reactor. It can be considered to be formed by the following main assemblies, which will be described in succession:

a repair station, the general makeup of which is shown in FIG. 2, having a fixed frame placed at the bottom of the deactivation pool and having a lift for moving assembly-receiving chambers between a high level and a low level, and also control mechanisms, a device for turning assemblies over, whose general makeup is shown in FIG. 3, the rotating mechanism being shown on an enlarged scale in FIG. 4, handling tools for handling the rotatable chambers, tools for removing the lower end member of the assembly; in accordance with the particular case, these can be limited to tools limited to a conventional assembly, or they can be distributed in a number of sets adapted to assemblies of a different nature, a device for transferring rods from an assembly contained in a chamber to a skeleton contained in another chamber, tools for putting the end member in place on the new skeleton; some of these, adapted to an assembly with removable end members, can be of the same kind as those already disclosed in French patent application No. 2,536,261.

The repair station (2) enables at one and the same time the rebuilding of assemblies and the replacement of the rods by the method disclosed and claimed in French patent application No. 2,536,261, by the use of suitable tools. This station comprises a parallelepipedic lattice work frame 20 placed on the bottom of the irradiated fuel evacuation compartment in a deactivation pool 22. To facilitate its handling, the frame can be made up of a number of assembled sections. In the embodiment illustrated in FIG. 1 the frame comprises a lower section 23 having adjustable feet 24 whose height and position can be controlled. Rigidly disposed in that section is a rod storage chamber 26 adapted to receive a rack (not shown) in which the rods are distributed in the same arrangement as in an assembly.

An intermediation section 25 connected to the lower section by mechanical indexing and locking means, is open on one of its side faces to enable assemblies to be introduced into the repair station. The intermediation section 25 is connected by mechanical means to an upper section 28 which is also open on one of its side faces. Disposed in the upper part of the section 28 is a support 29 for the attachment of tools for taking action on the assemblies. The upper section 28 also bears rails 30 on which a set of carriages 31 for positioning tools can run.

The three sections each accommodate a portion of the path of travel of a lift 32 adapted to move a fuel chamber between a low level, to enable an assembly to be introduced into and removed from the chamber, and a high level, where access may be had to the fuel assembly top end member. The lift 32 comprises two holders 34 disposed one above the other for the attachment of chambers. The lift 32 illustrated has an upwardly directed manoeuvring rod 35, enabling the lift to be displaced by means of an outside member, such as the tackle of a travelling crane. The rod 35 also enables the lift to be locked in the top and bottom positions.

The frame 20 also comprises in its intermediate portion 25 vertical rails for the movement of a carriage bearing a stand 36 for receiving tool-guiding masks; these masks will be described hereinafter. For this purpose the stand 36 has upwardly projecting pins 37. The stand will generally be of adequate dimensions to form a location for receiving a box (not shown) for evacuated irradiated elements, for example, screwthreaded sockets for attaching end members. The carriage of the stand can have a disconnectable rod 38 enabling the carriage to be moved by the tackle of a travelling crane and immobilised.

The set of carriages 31 borne by the upper section 28 enables movements to be performed in directions X, Y and Z at right angles. The set of carriages accurately positions the tools during phases of operation on the rods, when the lift is in the bottom position, or on the end members, when the lift is in the top position. The set of carriages can also be used during assembly reconstituting operations by the method according to the present invention and also for a rod replacing operation of the kind disclosed in French patent application No. 2,536,261.

The lower carriage 40 can be moved in the direction Y on the rails 30 attached to the upper section 35. It has a floor giving access to personnel to enable them to work with tools. The carriage 40 carries a guide 42 adapted to receive columns 117 of the rod-transferring tool (FIG. 8) which will be described hereinafter.

The carriage 40 bears the elements for entraining and guiding carriage 44 which can be moved along the direction of X. Finally, a third carriage 46 is provided which can be moved over a short distance in the direction Z with respect to carriage 44. This carriage can move over short shafts provided on the carriage X. It comprises a supporting plate 48 adapted to receive the tool to be positioned. Due to the availability of a vertical travel the supporting plate can be inserted over guide elements on the tool used and on the element handled by the tool. For example, the vertical travel can enable bottom pins with which an extracting tool is equipped (for example, the tools shown in FIGS. 26 to 28 of French patent application No. 2,536,261) to be brought up to the guide strips of the assembly-retaining chamber, without the need to use a travelling crane supporting the tool.

Figure 5:
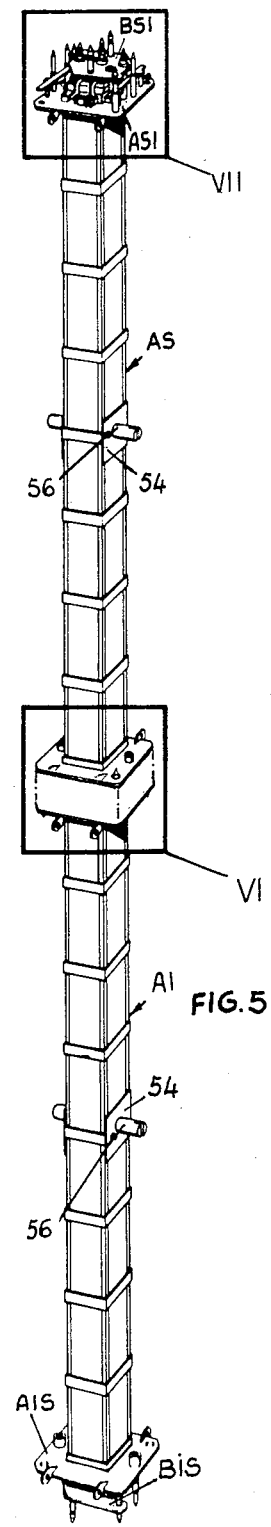
FIG. 5 is a perspective view of the chambers used in the apparatus, shown in the relative position which they occupy during the transfer of the fuel rods, the elements placed between the chambers not being shown.

The lift 32 is adapted to receive two superimposed chambers as shown in FIG. 5. The upper chamber AS initially contains a new skeleton without its end members. The lower chamber AI receives the assembly, without its lower end member, whose rods are to be extracted.

The two chambers are generally made up in the same way, enabling them to be attached to the lift 32 and tilted through 180° by means of the turning-over device shown in FIGS. 3 and 4.

Figure 7:
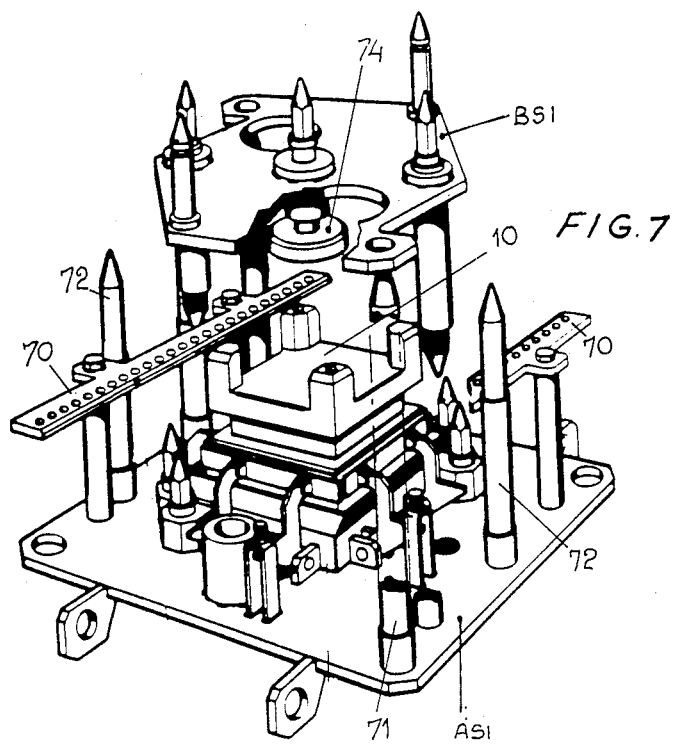
Figure 7A:
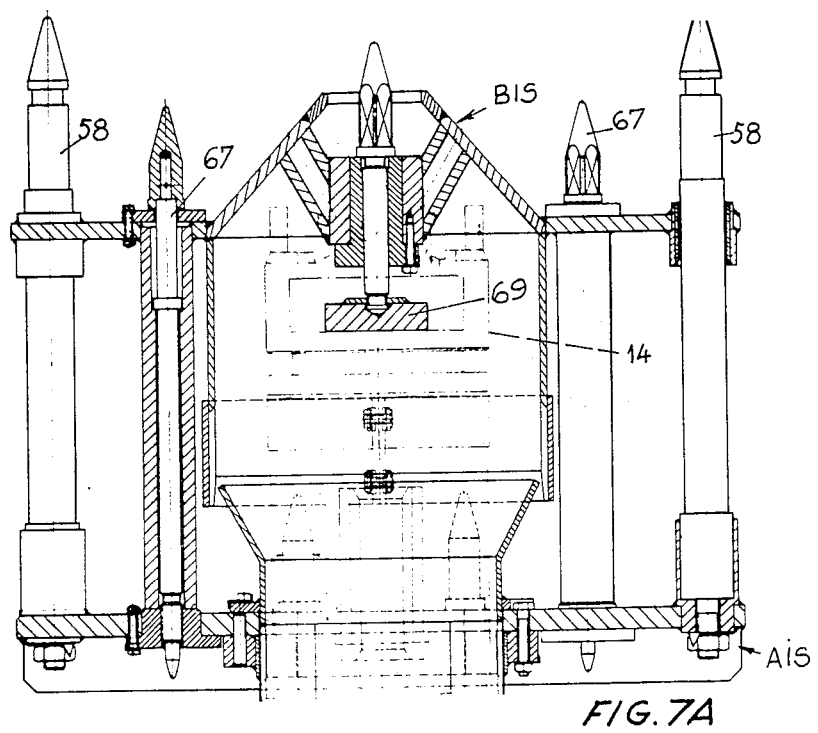
FIG. 7A is a view to an enlarged scale of the upper plug of the lower chamber, sectioned in a plane extending through the axis of the plug.

Each chamber has a mechanically welded structure with four angle irons strutted by belts. Attached to the centre of each chamber are two strengthening members 54 each having a half-pivot or trunnion 56. Two plates are attached by bolts to the ends of the structure of each chamber. In FIG. 5 these plates are denoted by ASS and ASI for the upper chamber (a plate is to be considered a lower plate if it is disposed on the same side as the lower end member of the assembly which is contained in the chamber, and conversely). Similarly, the plates of the lower chamber are denoted by the references AII and AIS. The plates enable the chamber to be handled, put in place and closed by plugs, such as plugs BIS and BSI which are shown in FIGS. 5, 7 and 7A. The plates also are adapted to index an assembly or skeleton and the tools to be used on the assembly.

In practice the plate AII disposed on the lower chamber AI on the side of the lower assembly end member (FIG. 6) has two grooved columns 58 enabling the chamber to be handled by a tool which will be described hereinafter. The columns 58 are also used for locating the corresponding end plug (not shown in the drawings). Three other columns 60 enable the tools for taking action on the assembly contained in the chamber AI to be centred. Four shoes 62, which can be moved together or apart by a wheel and endless screw mechanism from a square shaped head 64, which can be manoeuvred by a rod, provided for centring the assembly in the chamber and releasing it. Two centring rings 66 which are borne by plate AII enable the chamber AI to be attached in the repair station shown in FIG. 2. Flat bars 68 welded to the edge of the plate and formed with aligned holes enable the plate to be handled for operations other than those of repair or rebuilding.

The plate AIS (FIG. 7A) adjacent to the upper end member of the assembly contained in the chamber AI has the same accessorires as the plate AII and they have like references, although the plate AIS has no shoes for centring the assembly.

The plates of the lower chamber are adapted to receive plugs BIS and BII. These plugs retain the irradiated assembly when the chamber AI containing it is rotated into inverted position. The plug BII adjacent to the lower end member has at its centre a non-adjustable shoe which axially abuts the fuel assembly. It has two columns formed with circumferential grooves for handling purposes and it is formed with two indexing holes for engagement onto the columns of plate AII.

As in the case of the preceding one, the plug BIS disposed on the side of the upper end member has two handling columns, two attaching screws 67 and two positioning holes. Its shoe 69 is mounted at the end of a screw which can be manoeuvred by remote control under water by means of a rod, so that the assembly can be blocked axially and accidental axial displacements can be avoided.

The upper chamber AS comprises end plates which are slightly different from those of the lower chamber AI. The plate ASI (FIG. 7) differs from the plate AII in that the former has two strips 70 disposed on either side of its square opening; these strips are adapted to position the columns of the lower carriage of the tool for extracting and replacing rods, shown in FIGS. 26 to 28 of French patent application No. 2,536,261. The plate ASI also comprises two grooved columns 71 and three pins 72 for positioning the rod-transferring tool. The corresponding plug BSI is identical with the plug BII, except that its central shoe 74 can be adjusted longitudinally (FIG. 7).

Lastly, the plate ASS disposed on the side of the upper end member (FIG. 6) is similar to the plate ASI. However, it has no strips; it has an adjustable abutment ring 76 on each of the three columns 77 for positioning the upper chamber AS on the lower chamber AI. The rings enable the relative position of the chamber to be adjusted when they are in the repair station.

Figure 6:
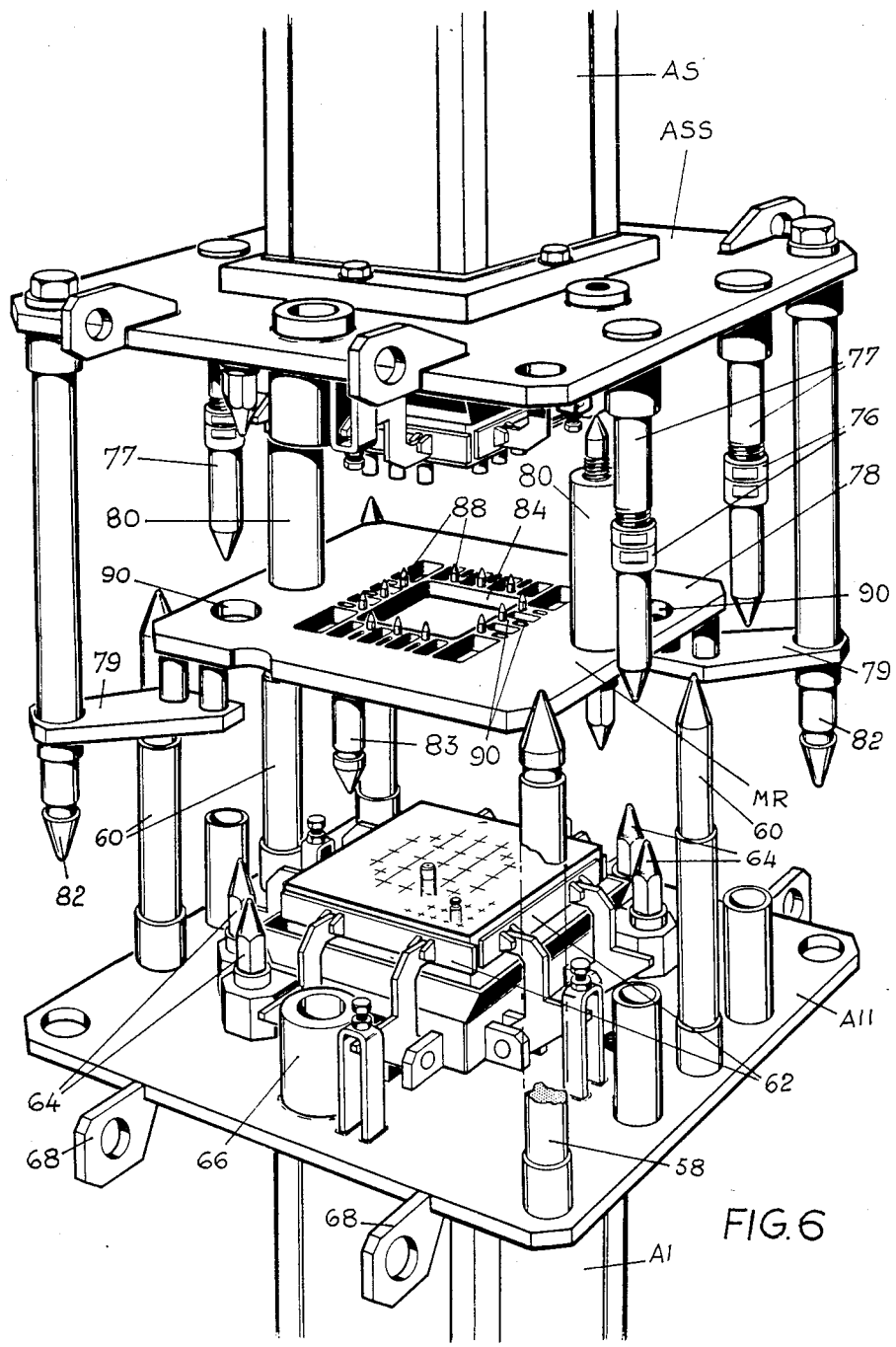
FIGS. 6 and 7 show, on an enlarged scale those parts of FIG. 5 enclosed by frames VI and VII respectively.

No plug need be provided at the upper end (i.e., on the upper side of the assembly) for the chamber AS. On the other hand, however, the chamber is designed to have a retaining mask MR (FIGS. 5 and 6). The functions of the mask are as follows:

to form an axial abutment for the assembly skeleton contained in the chamber AS when the latter is turned over, to transmit the weight of the skeleton and the rods introduced into the skeleton when the assembly is rebuilt, while allowing the rebuilding grab to have free access to all the rods contained in the lower chamber AI, to precisely align the upper part of the skeleton contained in the upper chamber AS with the skeleton of the assembly contained in the lower chamber AI.

The mask or template MR (FIG. 6) comprises a small plate 78 formed with two lugs having holes 79 enabling the mask to be centred on the two handling columns 82 of the chamber AS. The small plate is attached to the main plate by two screws 80. Attached to the small plate 78 are two grooved handling columns 83, with the same spacing as the plug-handling columns. The square aperture in the centre of the small plate 78 gives access to the rods disposed at the centre of the assembly contained in the lower chamber AI. Around the square central aperture 84 there are rectangular apertures separated by ligaments 86 provided to act as supports for the ends of the tie rods of the assembly skeleton contained in the chamber AS. Pins 88 attached to the small plate stand out from it on either side. They are adapted to engage in the peripheral tie rods, formed by guide tubes of the two assemblies during the rebuilding operations. Two holes 90 with which the small plate is formed give access to the squares 64 for manoeuvering the clamping shoes 62 of the plate AII.

The assembly turning-over device shown in FIGS. 3 and 4 is adapted to receive chambers of the kind disclosed hereinbefore. For reasons of simplicity, the device given by way of example is manually controlled. The device must enable:

a chamber containing an irradiated assembly to be retained under a height of water compatible with protecting the operators, the chamber to be tilted through 180° around a horizontal axis, while ensuring that the chamber is vertical in the initial and final positions.

The device shown in FIG. 3 is in two assembled parts, thus facilitating storage and enabling it to be adapted to different depths. Moreover, it forms a detachable assembly which can be inserted into the passage giving access to the fuel evacuation pit.

The lower part of the device mainly comprises a mechanically welded frame 92 resting on the bottom of the passage via shoes 94 which can be adjusted to make the frame vertical. The shoes 94 can be manoeuvred from an operating floor diposed above the pool, using a rod acting on manoeuvering squares with which the shoes are equipped. The frame comprises two lateral supports 95 receiving the pivot of the chamber to be tilted. Each support 95 has two rollers 96 (FIG. 4) enabling a ready-tilting of the pivot, which is driven by a shaft 97 to which a wheel 98 driven by a screw 99 is pinned. A rod enables a manoeuvering square with which the screw 99 is equipped to be rotated from the operating floor.

The frame 92 also comprises two upwardly extending vertically tubular guides 100 adapted to receive the uprights 101 of a gallows-shaped member 102.

The gallows-shaped member 102, which is adapted to enable the turning-over device to be handled, comprises uprights 101 which can be attached to guides 100 in a number of positions by means of pins 103, and a cross member 104 welded to the uprights. The pins can be formed with a number of holes, to enable the overall height of the turning-over device to be shortened during handling outside the pool. Attached to the cross member 104 are two forks each having two clamping shoes 105 adapted to bear on either side of the wall 106 bounding the neck. The shoes form a safety device which completely prevent the device from being upset during the assembly turning-over operations.

Figure 9:
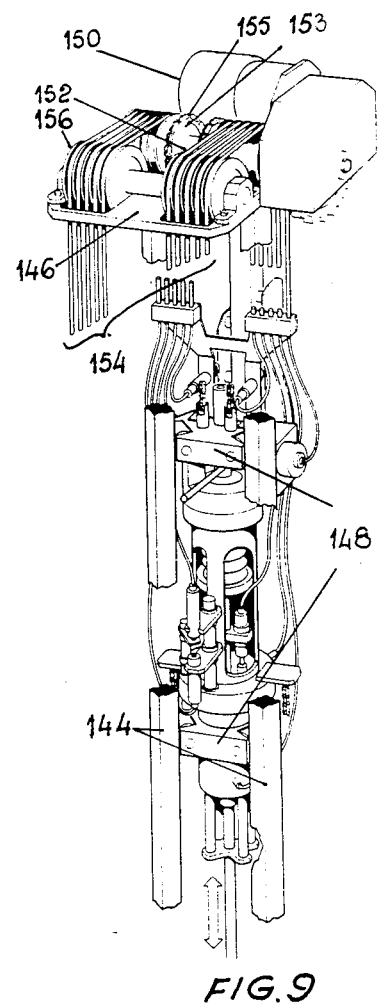
FIG. 9 shows, on an enlarged scale that part of the rod transferring tool which is disposed in the frame IX in FIG. 8.
Figure 8:
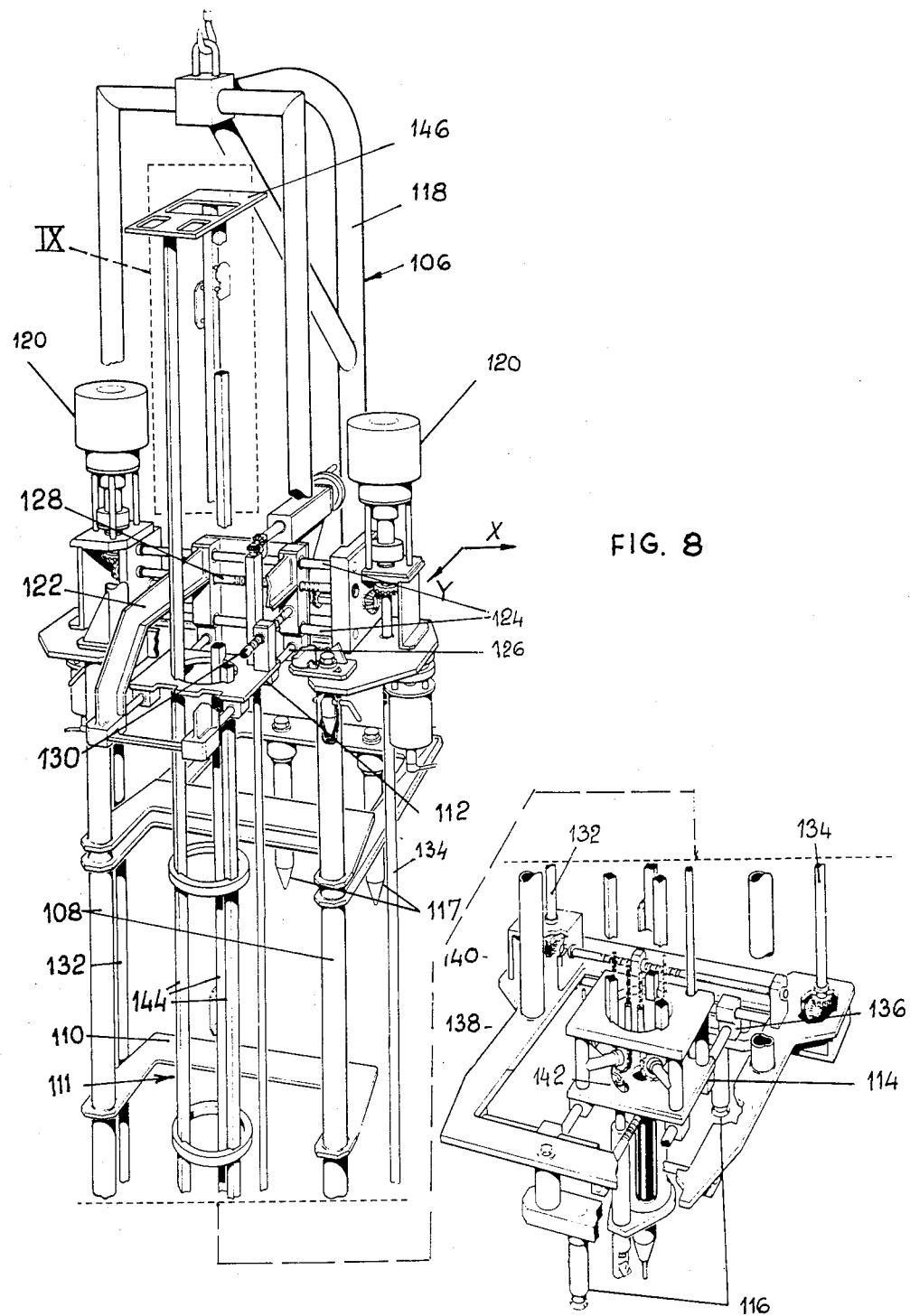
FIG. 8 is an overall perspective view of a rod transferring tool which can be used in the apparatus, the elements disposed in the frame IX not being shown.

The upper section of the frame of the station (FIG. 2) is adapted to receive more particularly a rod-transferring tool 106 shown diagrammatically in FIGS. 8 and 9. The tool is adapted to be moved above the chambers when they are disposed in the repair station, to pull the sound rods out of the damaged skeleton, and to reintroduce them into the new skeleton disposed above.

The tool 106 comprises a mechanical portion partially submerged in the pool and an electronic and pneumatic assembly (not shown) disposed outside the pool and adapted to actuate the moving elements of the tool.

The mechanical portion can be regarded as being formed by a supporting frame a vertically movable coupling having at its lower end a grab for seizing the rods, and a cage for guiding the movable coupling during its vertical displacement.

FIG. 8 shows that the supporting frame comprises a framework formed by two vertical tubular uprights 108 connected from place to place by spurs 110. The two uprights 108 are attached at their ends to the base of an upper cross motion table 112 and the base of a lower cross motion table 114. The framework can rest on the chamber AS via hollow supporting columns 116 which engage on the positioning pins 72 rigidly connected to the base ASI, so as to properly determine the horizontal and vertical position of the supporting frame in the repair station. Two retaining pins 117 rigidly connected to the columns 108 index the tool on the upper section of the station.

A bowed member 118 attached to the base of the upper table 112 and to a strut of the uprights 108 enables the tool to be handled with a tackle.

The upper cross motion table is adapted to adjust the horizontal position of the guide cage 111. The table is disposed above the level of the water in the pool when the tool is used. It carries two variable speed d.c. motors 120 adapted to actuate the plates which can be moved in the direction X and the direction Y respectively.

The plate which can be moved in the direction X comprises two arcades 122 sliding on rails and each bearing one end of the rails 126 for guiding the plate which can move in the direction Y. The axes of the two rails 124 and of the screw 128 for entraining the plate are in the same vertical plane.

The plate which can be moved in the direction Y is formed with grooves for retaining the guide cage 111 which will be described hereinafter. The plane can be moved in the direction Y by any transmission mechanism. In the embodiment illustrated in FIG. 8, the transmission mechanism comprises a square rod for rotating a screw with balls 130, which slides in its drive pinion (not shown in the drawing) which is rigidly connected for translation to the plate which can be moved in the direction X.

The lower cross motion table 114 must reproduce the movements of the upper table and therefore has the same general configuration. The movements of its plates in the directions X and Y are controlled from motors 120 via shaft 124 and 134 for the directions X and Y respectively. The plate 136 which can be moved in the direction X is mounted to slide on two guide rails disposed in the same horizontal plane and attached to a base 138 rigidly connected to the two uprights 108 of the framework. The three hollow rods 116 for supporting the framework on the upper chamber are attached to such base. The plate 136 is moved in the direction X by a bevel gear and a ball circulation screw-and-nut connection 140.

The plate 142 movable in the direction Y is mounted to slide on rails belonging to the carriage X. It supports the cage 111 for guiding the movable coupling and comprises a grab guide.

The cage 111, which acts as a vertical guide for the movable coupling and the rod-handling grab, is attached to the plate 142 movable in the direction Y of the lower cross motion table 114 and is guided in the corresponding plate of the upper table 112. The cage is made up of three rails 144 regularly distributed at an angle of 120° from one another around an axis and connected by circular struts. The upper end of the rails 144 bears a plate 146 which receives the motorization mechanism of the movable coupling. The mechanism is not shown in FIG. 8, but appears, with the upper part of the movable coupling 148, on FIG. 9. The motorization mechanism comprises a variable speed, reversible d.c. electric motor 150 which drives a shaft 152 via a step-down gear and a torque limiter. The shaft 152 bears toothed wheels 153 which drive chains 155 to displace the movable coupling 148 in the vertical direction (direction Z), and also grooved wheels for guiding electric cables and pneumatic flexible tubes 154 connected to the moving coupling. The cables and flexible tubes also pass over grooved wheels 156 mounted on the front part of the plate 146 forming a return to length-compensating systems conventionally comprising pulleys mounted on a movable support.

The movable coupling 148 is adapted to confer the different necessary movements on the grab 149 for seizing the rods and its interal components. It supports the members for monitoring such movements and forces applied to the rod.

The grab 149 forms the lower part of the moving coupling. The grab is so designed that it can pass through the new skeleton and comprises (FIG. 9A) a traction tube connected to the frame of the moving coupling, bearing the member for seizing the rods, which is formed by four resilient plates whose profile fits snugly around the shape of the plug of the rods 11 to be transferred. The plates can be locked in the groove by the descent of an outer sheath 151. Disposed in the axis of the grab is a feeler 160, which allows a check that the rod plug is correctly engaged in the end of the grab before locking.

The frame of the moving coupling 148 (FIGS. 8, 9 and 9A) comprises a frame whose two end plates each have three guide rollers 157 on the rails 144. The frame is suspended from two chains 155 via means for maintaining them under a substantially constant tractive force (not shown).

Figure 9A:
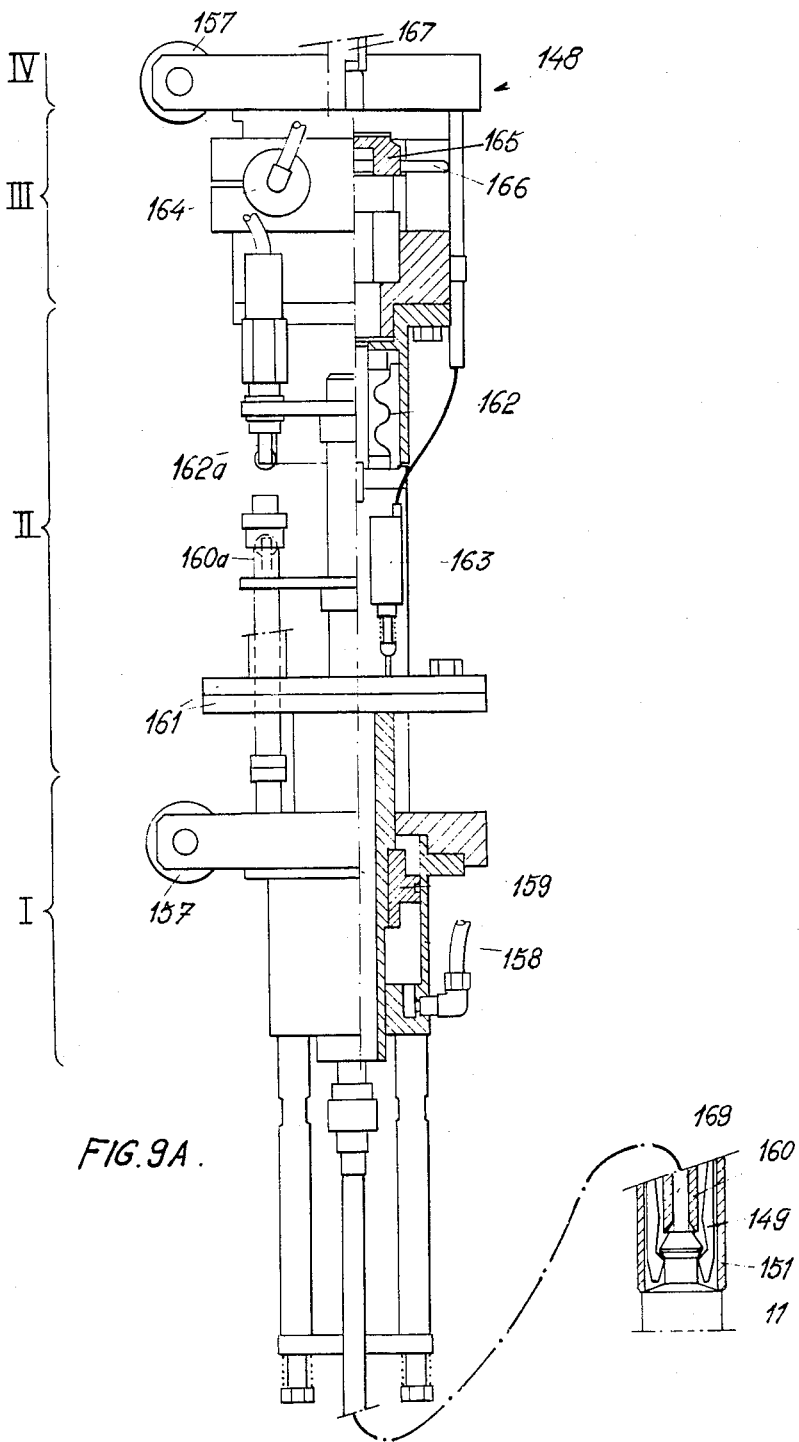
FIG. 9A shows the movable equipment of the tool shown in FIG. 8.

Referring to FIG. 9A, the lower stage I of the coupling 148 bears the means for locking the grab 149 which seizes the rods 11. The sheath 151 closing the grab is connected to cylinder 158 of a double-acting jack whose piston 159 is rigidly connected to the frame. Progressive springs are interposed between the columns and a plate connected to the sheath, to allow the necessary clearances for monitoring the forces.

Stage II of the moving coupling is adapted to monitoring the movements of the grab and the forces. It comprises a shaft 160a which is rigidly connected to the cylinder 158 and extends through flanges 161 of the coupling frame. The end of the shaft 160a actuates end-of-travel contacts, only one 162a of which is shown, for controlling the locking and unlocking movements of the grab. the contacts are disposed in the circuits of the control logic.

Bellows 162 enable the forces exerted on the rods 11 to be transferred to be controlled. These variations in length are followed by a, for example, inductive displacement pickup 163 attached on the one hand to the traction tube of the grab and on the other to the coupling frame.

Stage III is adapted to ensure the forced opening of the grab after unlocking, in order to release the rod, if anything goes wrong when the rod is at the top level, where it is to be released. To this end the stage III comprises a double-acting jack 164 driving a rotary nut 165 formed with a vertical groove. A finger 166 rigidly attached to the feeler extends to the groove. The actuation of the jack 164 makes the feeler 160 rotate, whose lower end has four projections (not shown) which in the normal position are received between the resilient blades of the grab.

Stage IV is adapted to monitor the position of the grab and the relative position of the rod. It comprises a pickup 167 controlling the position of the rod 169 of the feeler, such rod resting on the end of the fuel rod during the transfer. The pickup 167 is attached to the upper plate of the frame of the coupling 148.

The handling tools adapted to take action on the chambers comprise a chamber-handling tool OMA, a tool OMB for handling the masks and plugs, and control and manoeuvering rods.

The tools OMA and OMB are similarly constructed. The tool OMA, an overall view of which is given in FIG. 10, is used for handling the chamber AI and AS which can be turned over from a travelling crane. It is formed by two sections:

a lower section 170, which is locked on the two grooved columns 58 or 82 with which each of the end plates of the chambers is provided:

an upper section 172, which is a lengthening piece interposed between the upper section and the crane hook, to prevent a loaded chamber from being possibly brought out of the water, since its length is such that when the crane hook abuts at the top, a layer of protective water subsists above the assembly.

The section 170 is similar to the tool illustrated in FIG. 7 of application No. 2,536,261, to which reference can be made. It is made up of two coaxial tubes which can rotate in relation to one another between a position allowing the engagement of the tool with the columns (the position shown in FIG. 10) and a locking position. Attached to the lower end of the external tube, for instance, by welding, is a plate 176 having two vertical cylindrical guides 178 adapted to fit over the columns 58 or 82. Each guide 178 is formed with a horizontal aperture over almost three-quarters of the angular extent of the guide, in line with the horizontal groove in the handling column to be seized.

Attached to the lower end of the inner tube, for example, by welding, is a blade 180.

When the inner tube is in the locking position, two notches 182 with which the blade 180 is formed engage, via the apertures in the guides 178, in the horizontal grooves in the columns, thus interlocking the tool OMA of the chamber to be handled. When, on the other hand, the inner tube is in the position shown in FIG. 10, the blade 180 releases the path of the handling columns and enables the tool to be engaged or disengaged.

In the case illustrated in FIG. 10, the tubes can be orientated in relation to one another by means of a set of two handles 184.

The upper section 172 is formed by a tubular rod having a handling ring (not shown) at its top end. At its bottom end the rod comprises a square hole adapted to receive a terminal square portion 187 of the section 170 to provide interlocking during rotation. The bottom end of the upper section also comprises a tapped ring for the connection of the lower section.

The tool OMB for handling the masks and plugs has the same construction as the tool OMA, except that the guides 178 are at a smaller distance apart, since the distance apart of the axes of the grooved columns as 83 of the masks is smaller than on the chambers.

The tool OMB (not shown in the drawings) is used for the underwater handling of the chamber end plugs and various accessories used in the repair or rebuilding operations.

The tool OMB can be limited to its lower section, the upper section being shared with the tool OMA.

The control and manoeuvering rods are used to act under water on the various manoeuvering squares, for example, the squares of the shoes 94 of the turning-over device the actuating square for the chamber turning-over mechanism on the turning-over device, the manoeuvering squares of the wheel and endless screw systems for centring and assembly in the chambers, the squares for tightening and loosening the screws 67 for attaching the chamber end plugs to their plates.

As a rule a number of rods of different lengths will be provided. FIG. 11 shows by way of example the lower portion of such a rod, forming an adjustment tool OR. The tool is a simple socket wrench having a shape corresponding to that of a manoeuvering square. The rod can be in a number of sections connected by tapped rings, as in the case of the tool OMA.

The tools for removing the lower end members will depend on the nature of the means for connecting the lower end member of the damaged assembly and the tie rods. We shall now describe the tools to be used in the case of a lower end member of fuel assemblies considered to be standard ones, whose lower end member is, as shown in FIG. 1, attached by slot-headed screws 16 rendered unreleasable by the addition in their slot of pins 17 welded to the end member.

The dismantling tools comprise tools for exerting an action—i.e., active elements—and masks adapted to guide such tools and each adapted to a corresponding tool. To take action on a standard assembly of the kind shown in FIG. 1, the dismantling tools comprise:

a tool OF for milling pins 17 for immobilizing screws 16 for attaching the end member 13 to the tie rods of the skeleton, a mask MF for guiding the milling tool on the lower end member to be removed, a screwdriver tool TIS for unscrewing the screws for attaching the end member, a mask MIS for guiding the screwdriver tool TIS on the end member, such mask also serving for the evacuation of the screws, a pusher tool OP for disengaging the screws from the guide mask.

Figure 12:
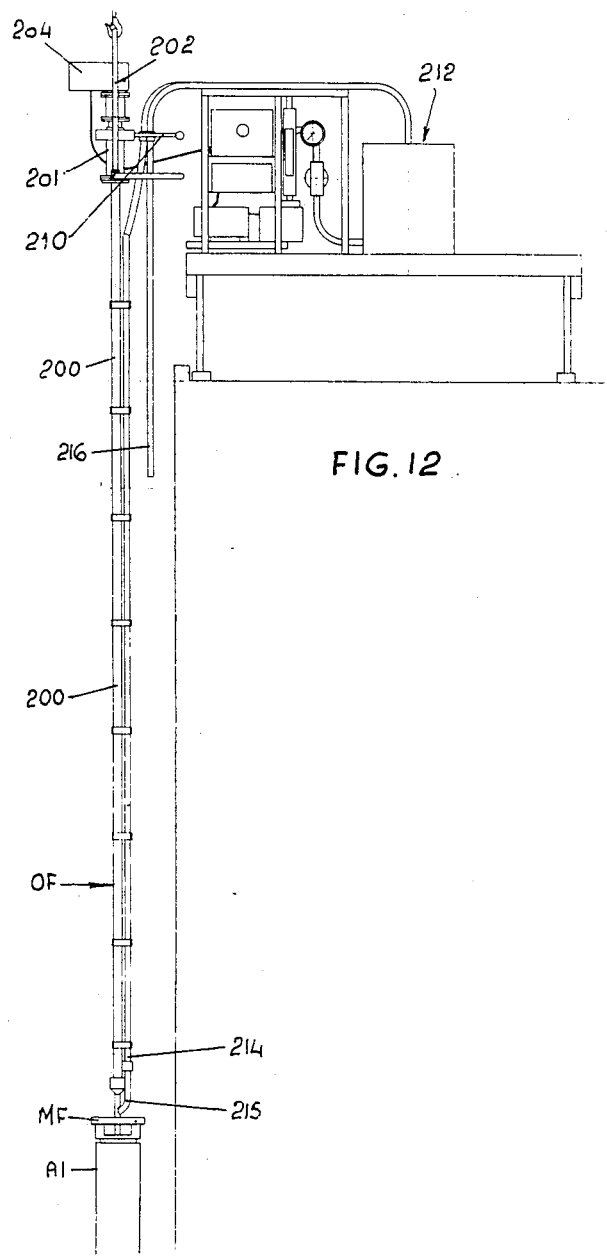
FIGS. 12 and 13 show in a simplified manner a pin milling tool and its accessories, which can be used in the apparatus shown in FIG. 2, in elevation and plan view respectively.
Figure 13:
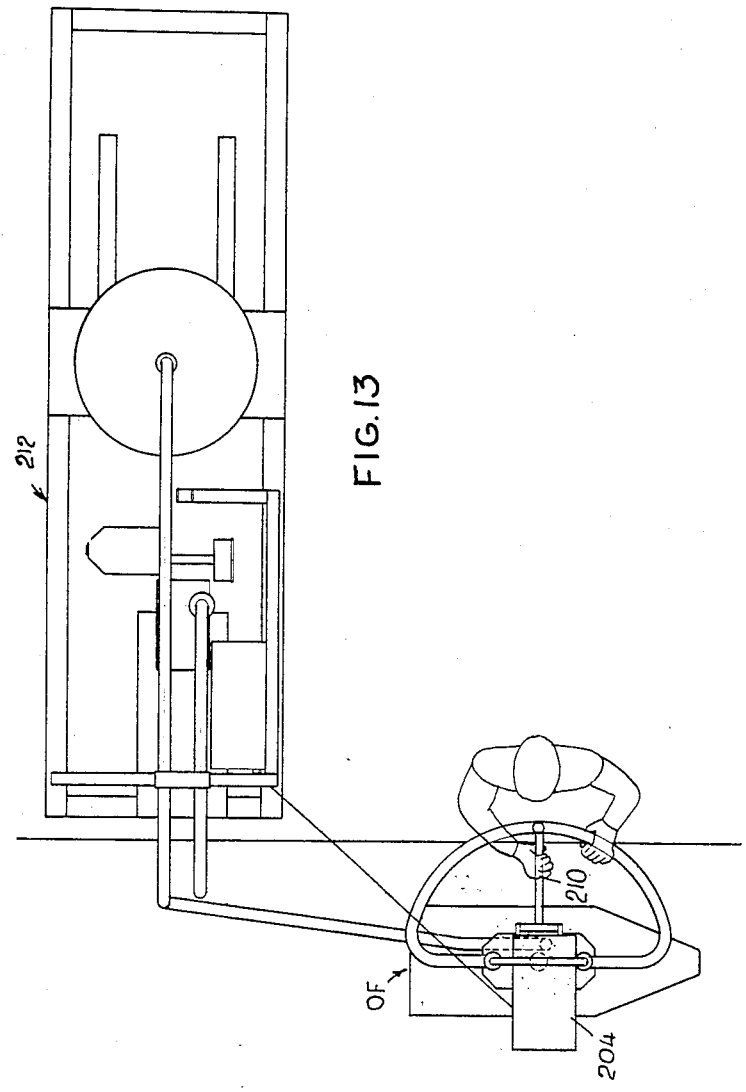
Figure 14:
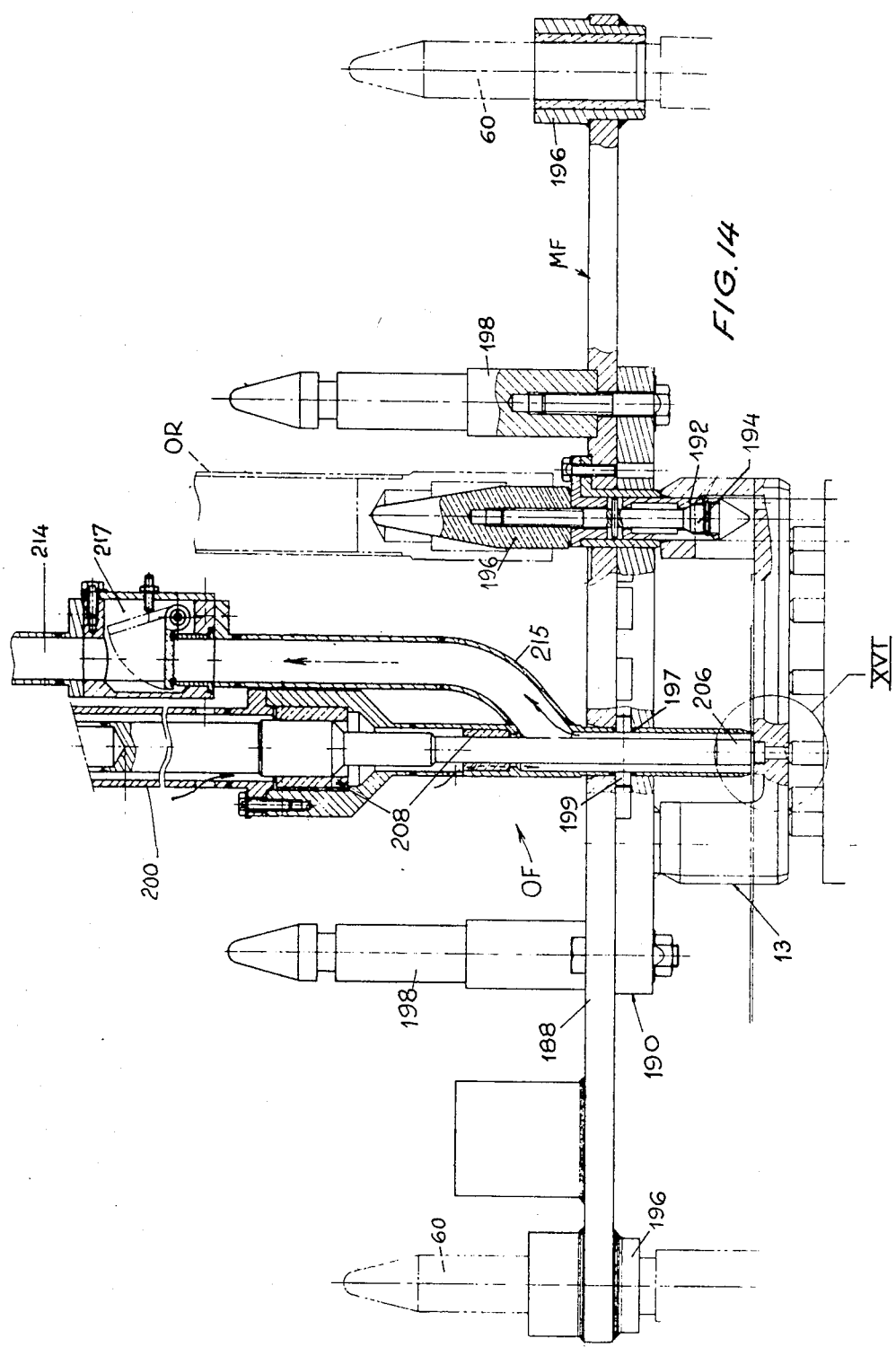
FIG. 14 is a view in vertical section through the lower part of the milling tool shown in FIG. 12.
Figure 16:
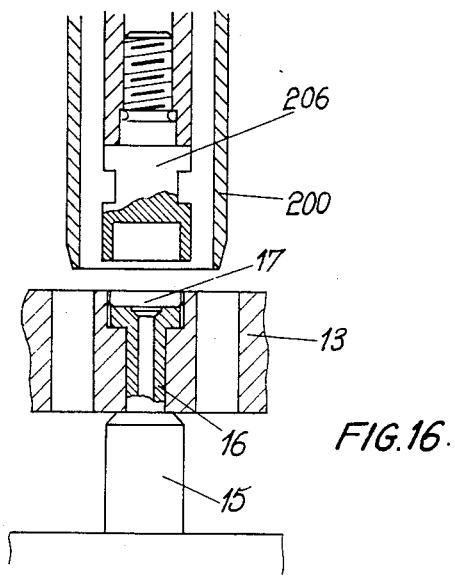
FIG. 16 shows on an enlarged scale the detail contained in circle XVI in FIG. 14.

In FIGS. 12 and 13 the milling tool is shown attached to its manoeuvering tackle and in place on a lower chamber having a mask MF. FIGS. 14 and 15 show more clearly the structure of the lower part of the tool and of the mask MF. Lastly, FIG. 16 shows the way in which the milling cutter of the tool acts on a pin 17.

The guide mask MF (FIGS. 14 and 15) performs two functions. It guides the lower end of the milling tool OF so that it is coaxial with the connecting screws between the tie rods 15 and the lower end member 13. It forms an axial abutment for the body of the tool when the milling cutter is advanced as machining progresses.

The mask MF is made up of a plate 188 attached, for example, by bolts, to a baseplate 190 adapted to rest on the feet of the end member 13. Extending through the plate-and-base assembly are two split bushes 192 which can be expanded by means of conical nuts 194, to enable to mask MF to be locked in the assembly positioning holes with which the feet of the standard end members are formed. The nuts can be actuated by manoeuvering squares 196 by means of the manoeuvering tool OR, shown in chain-lines in FIG. 14.

The plate 188 has bushes 196 adapted to engage over the three columns 60 of the lower plate AII, these being shown in chain-line in FIG. 14. The plate 188 has two grooved columns 198 enabling it to be seized by the handling tool OMB.

The plate-and-base assembly is formed with 24 bores 197 for guiding the tool OF. Two bayonet passages open into each bore in the plate, to allow the introduction of stubs 199 with which the milling tool OF is formed, in order to produce an axial abutment for the attachment of the milling tool OF.

The general construction of the tool OF is shown in FIG. 12. It should be pointed out incidentally that the way in which the tool OF is attached (FIG. 12) is also adopted for the other dismantling and reassembling tools. The tool OF, which is typically a tubular assembly about 4 m in height, can be regarded as comrising a sleeve 201 having a handle 202 for suspension from the winch of the travelling crane, a sheath 200 which can slide in the sleeve 201, a step-down gearing 204 borne by the sheath 200, and a rotary unit driven by the motor and guided in the sheath 200 by ball bearings (not shown in the drawings). The rotary unit comprises a pin connected to the output shaft of the step-down gearing 204 via a toothed coupling (not shown) and a rod with an end milling cutter 206 guided in the sheath by bronze rings 208 (FIG. 14). A lever 210 enables the sheath to be moved longitudinally in the sleeve 201 over a length corresponding to the required advance of the milling cutter to cut off a blocking pin.

The milling tool OF is completed in the embodiment illustrated in FIGS. 12 and 13, by a filtration assembly 212 comprising a removal tube 214 connected to a chip-removing duct 215 on the sheath, so as to suck up the swarf, and a return conduit 216. The pipe 214 is rigid and attached along the sheath 200. It has a flap valve 217 which prevents the chips entering the pool if the pumping system stops accidentially. In its upper part it has a bend terminating in a connection to a flexible pipe for connection to the filtration assembly. Incidentally, the milling tool, like the other tools, is operated manually, the only electrical accessories being the drive motor of the pump of the water filtration system and the motor of the milling tool.

Figure 17:
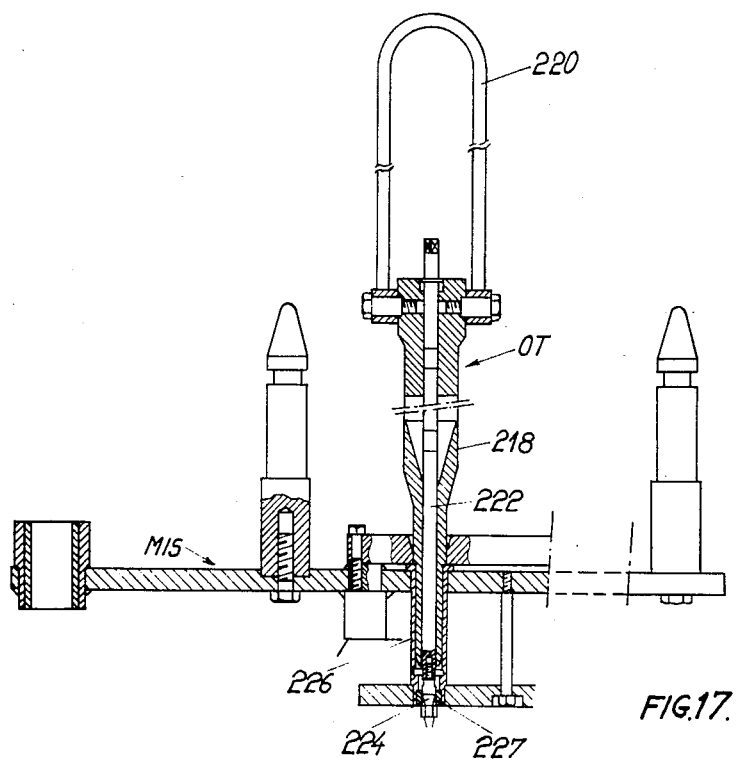
FIG. 17 is a view in elevation and partial longitudinal section of a demounting screwdriver tool which can be used in the apparatus shown in FIG. 2.

FIG. 17 shows the dismantling screwdriver tool in place on a screw to be removed, its guide mask MIS being shown only in part. The mask will not be described again, since it can be very similar to the mask MF, except that it is adapted to enable the screws to be evacuated after they have been removed.

The screwdriver tool OT comprises an outer tube 218 having an operating handle 220 and a rod 222 guided in the tube 218. The top end of the rod has a shoulder for retaining it on the tube and terminates in a manoeuvering square enabling the loosening torque to be applied by a dynamic wrench. The end of the rod is adapted to receive profiled end members 224 acting as a screwdriver blade.

FIG. 17 shows how the holes for guiding the screwdriver tool in the mask MIS, unlike the mask MF do not have bayonet grooves, but they have rings 226 receiving elastomeric sleeves 227 which trap the screw heads on completion of unscrewing and enable them to be evacuated with the mask.

Lastly, the screw-pushing tool, adapted to disengage simultaneously all the screws trapped in the elastomeric sleeves of the mask MIS after the evacuation thereof, can be limited to a tubular rod having a handle which has in its lower part 24 pins forming pushers: to drive out the screws it is enough to insert the 24 pins simultaneously by lowering the rod.

Like the end member removing tools, the end member replacing tools must be adapted to the method of attachment adopted. In what follows it will be supposed that the end member to be remounted is attached by means of screws having expandable ferrule for immobilizing the screw once it has been completely introduced.

The screwdriver tool TIA can be identical with the tool TIS shown in FIG. 17, except that its lower end member is adapted to the profile of the slot in the screw to be tightened.

Figure 18:
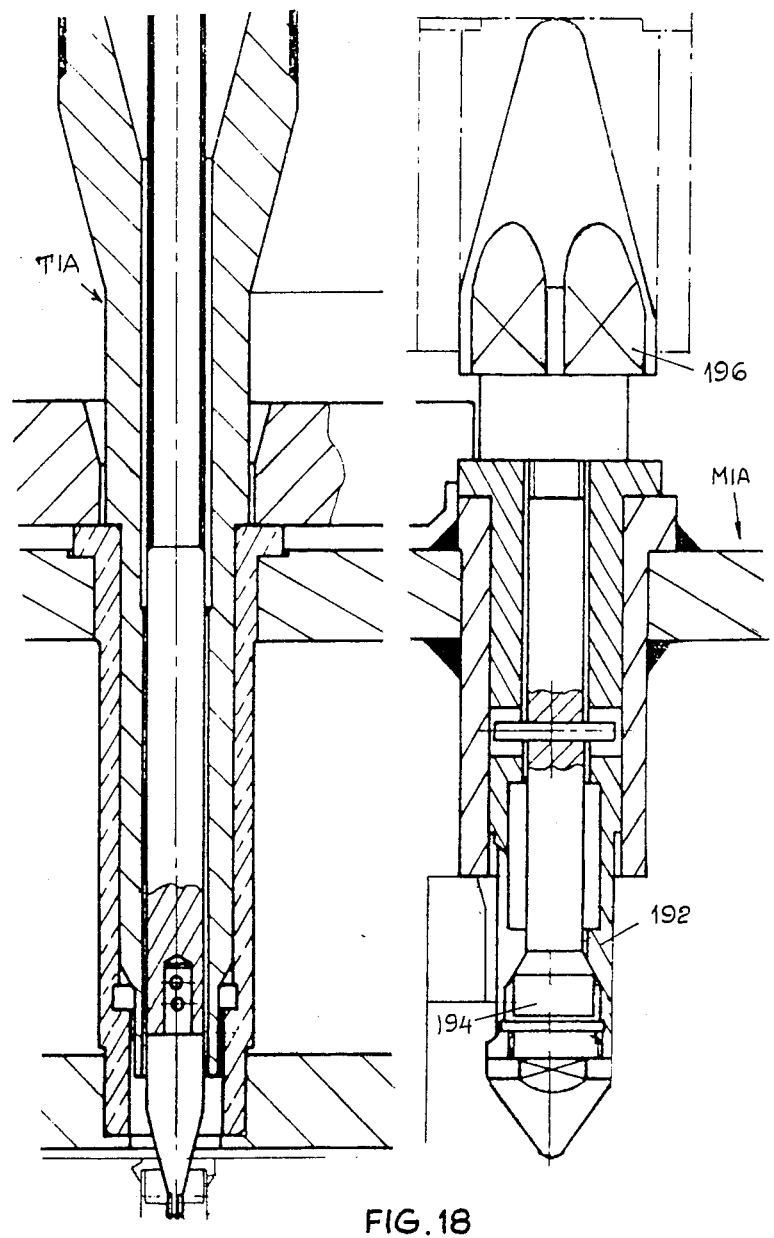
FIG. 18, similar to a fragment of FIG. 17, shows the lower part of a screwdriver tool for reassembling an end member which can be used in the apparatus shown in FIG. 2.

During its use, the screwdriver tool TIA must be carried by a mask MIA. The mask, a fraction of which is shown in FIG. 18, can be identical with the mask MIS, except that it has no elastomeric sleeves, which would interfere with the passing of the expansion tool OEI, and it is formed with grooves terminating in the guide holes to form axial abutments for the stubs of the expansion tool.

The expansion tool (FIG. 19) is adapted to lock the screws unloosenable and unloosenable by the deformation of their cups into recesses of the lower end member. To this end the tool comprises an outer tube 226 having an operating handle 228. The lower portion of the outer tube has stubs 238 adapted to act as an axial and circumferential abutment by engaging in the grooves in the mask MIA. A rod in two parts is mounted in the tube 226. The lower portion 232 of the rod bears a mandrel 234 for crimping the screws to change their skirts 236 from the shape shown in FIG. 20A to the shape shown in FIG. 20B. The rod is so connected for corotation to the outer tube 226 as to ensure the orientation of the mandrel in relation to the stubs 230, but it can make a translational movement over a limited length, a spring (not shown) returning the rod to the top position. The upper portion of the rod bears axially against the lower portion. It is connected to the outer tube via a screw-and-nut connection which can be controlled by means of a square 237. The application of a torque to the square 237 by means of a dynamometric wrench causes an axial force, transmitted by a plane/sphere contact, for deforming the skirts of ferrules 236.

Figure 22C:
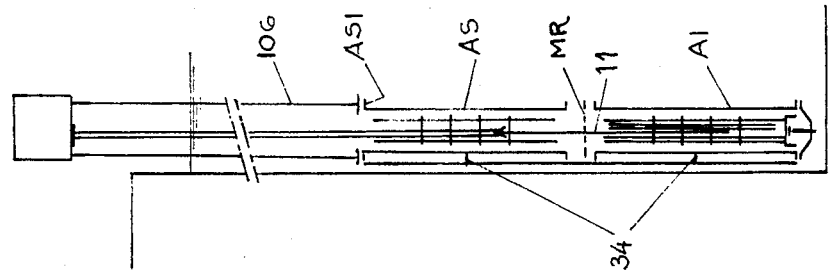
Figure 22B:
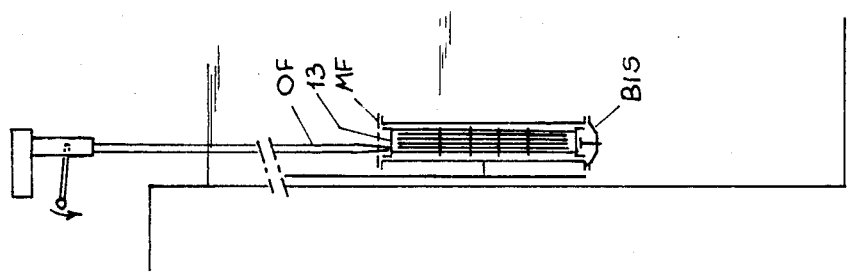
Figure 22A:
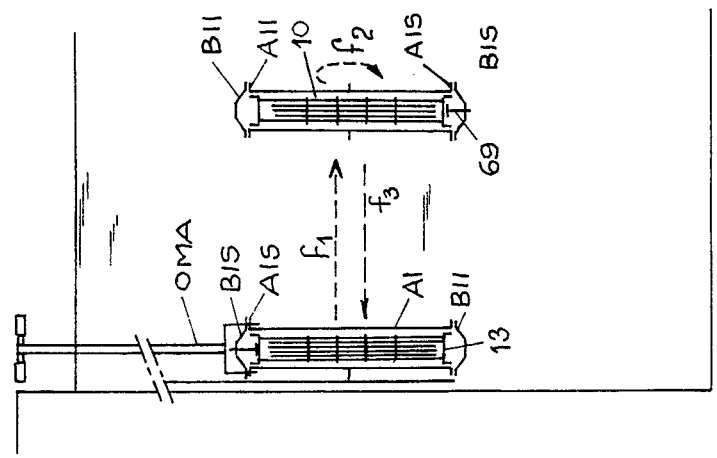

A description will now be given, by way of example and referring to FIGS. 22A–22C, of the operations which are taken with a view to rebuilding an assembly by the transfer to a new skeleton of the rods of a damaged assembly 10 of standard type.

It will be remembered that the term "lower chamber plug" BSS or BIS refers to the plug disposed on the side of the lower end member of the assembly contained in the chamber, and conversely.

In the initial condition of the apparatus, the lower chamber AI is deposited in upstanding position on the lift (at the lower level of attachment, the upper plug being removed). The upper chamber AS is in the meantime stored in the inverted position, with the retaining mask MR in place. The upper chamber contains a new assembly skeleton, without end members, clamped by means of the pad 74. The damaged assembly 10 is taken by a travelling crane and deposited in the lower chamber AI. The latter is raised to the higher level by the lift. Upper plug BIS is inserted and locked. The assembly 10 is blocked axially and clamped radially by acting on the pad 74.

The chamber AI is attached to the handling tool OMA, transferred by the crane to the turning-over device and tilted. After being turned over, the chamber is seized by the handling tool OMA again and then placed at the lower attachment level on the lift while the latter is in top position (arrows $f_1$, $f_2$, $f_3$ in the FIG. 22A).

The lower plug BII of the lower chamber AI is then withdrawn to enable the lower end member 13 to be removed. Such removal requires the following operations:

bringing in the mask MF by means of the handling tool OMB and depositing the mask on the lower end member 13 of the damaged fuel assembly, the immobilization of the mask, by the expansion of its two split bushes 192 in the end member positioning holes, bringing the tool OF for milling the pins into one of the guide holes, and locking the bayonets by the engagement of the stubs 199 (FIG. 22B), hydraulic connection to the pumping set 212, starting up and controlling the water flow, successive milling of all the pins 17, for example 24, stopping and evacuating the tool and the pumping assembly, disconnection and evacuation of the mask MF, bringing in the mask MIS for indexing on the lower end member, and immobilization thereof by the expansion of the split bushes of the mask, unscrewing the screws 16 with the screwdriver TIS, and simultaneous engagement in the sleeves of the mask, withdrawal of the mask MIS, rigidly connected to the end member 13 and containing the screws 16, using the handling tool OMB; depositing the assembly on a container for evacuating the screws, disconnection of the mask MIS from the end member 13, ejection of the screws 16 using the pusher tool OP, taking up the mask MIS again with the handling tool OMB and depositing it on its storage stand.

The lift carrying the lower chamber AI is then descended to its bottom position. The upper chamber AS is placed on the lift at the top attaching level, then aligned with the lower chamber AI. The rod-transferring tool 106 is positioned above the chambers and its supporting columns 116 are engaged with the columns of the plate ASI. The grab is lowered through the upper skeleton as far as the level of the plug of the rod 11 to be extracted. The grab is locked and then lifted to transfer the rod to the upper skeleton (FIG. 22C). The rod is released, then operations are resumed until all the rods (for example, 264) have been transferred.

Once the rods have been transferred, the skeleton must be given new end members to reconstruct a complete assembly. The mounting of the end members calls for the following operations:

Introduction and positioning of the lower end member:

The mask MIS, already rigidly connected to the lower end member in proper position and containing the 24 new screws for attachment to the skeleton is brought in by the handling tool OMB and put in position on the skeleton, The level of the mask can be checked, for example, using a measuring tool OT of the kind illustrated in FIG. 21, Each of the 24 screws is tightened with a suitable torque, using the screwdriver tool TIA, The skirts of the 24 screw are successively deformed by bringing in and lowering the expansion tool OEI to make the screws unloosenable, The mask MIS is removed and deposited on its storage stand, The lower plug BSI of the upper chamber AS is screwed on to its plate ASI, then the upper chamber AS is taken again by the handling tool OMA, deposited on the turning-over device, then tilted through 180°.

After removing the upper chamber from the lift, the used assembly, emptied of its rods, can be completed by an end member and evacuated; for this purpose, the lift of the repair stationis returned to the top position. The lower end member of the damaged skeleton, still attached to the mask MIS, is replaced on the skeleton by means of the handling tool OMB and four screws are screwed back on to their guide tubes to allow the evacuation of the skeleton. The lift is lowered into the bottom position and the damaged skeleton is removed to a storage area. The lift is taken up again, then the lower plug BII of the chamber AI is attached. The lower chamber is withdrawn from the station and placed in a stand-by position.

Introduction and positioning of the upper end member:

The upper chamber AS is put on the lift at the bottom attaching point,

Using the handling tool, the mask MIS, already rigidly connected to the upper end member 14 and containing 24 new screws for attachment to the skeleton of the rebuilt assembly, is brought up and placed on the tie rods, The level of the mask is checked with the measuring tool OT, The 24 screwthreaded bushes are screwed individually, using the screwdriver tool TIA, into the guide tubes, The skirts of the screwthreaded bushes are deformed to make them unlosable and unloosenable, using an expansion tool similar to the tool OEI, The lift is lowered into its bottom position.

The rebuilt assembly is then removed to storage by means of the travelling crane associated with the power station fuel handling tool. The lift is taken up again and the upper plug BSS is attached to the upper chamber AS, which is then removed to a storage position. The lower chamber AI is attached to the lift at the lower attachment level, its plug is removed, then the lift is brought down again to return to the initial situation.

We claim:

1. An apparatus for rebuilding a nuclear fuel assembly comprising a skeleton having two end members connected by tie rods attached to the end members and grids distributed between the end members along the tie rods, which grids retain a cluster of fuel rods located between the end members, comprising:

a first chamber for receiving a fuel assembly, comprising means for securely retaining the assembly in said first chamber, while permitting removal of one of the end members of said fuel assembly, a second chamber for receiving a new fuel assembly skeleton identical to the skeleton of said assembly in the first chamber but without end members, said second chamber having means for temporarily immobilizing the new fuel assembly skeleton, a repair station comprising lift means for receiving said first chamber and second chamber in vertical alignment with each other, for bringing the chambers to a level such that there subsists a layer of protective water above the fuel rods, a rod transfer tool means for drawing one fuel rod at a time into the new fuel assembly skeleton from the assembly contained in the first chamber, means for mounting end members on the new fuel assembly skeleton, and a skeleton retaining mask having means for releasably attaching the skeleton to a lower end of the first chamber, and means for indexing said mask with respect to the first chamber, said mask being formed with apertures for guiding the rod transfer tool, one rod at a time.

2. An apparatus according to claim 1, wherein each of said chambers further comprises, at each end, plates each provided with columns for connection of a chamber handling tool.

3. An apparatus according to claim 2, wherein at least some of said plates are adapted to receive a detachable fuel assembly retaining plug which also has columns for receiving a handling tool.

4. An apparatus for rebuilding a nuclear fuel assembly comprising a skeleton having an upper end member, a lower end member, tie rods permanently secured to said upper end member and releasably secured to said lower end member and a plurality of grids distributed along said tie rods and connected thereto and further comprising a cluster of fuel rods located between the end members and retained by said grids in a predetermined regular array, including:

- a first chamber for receiving a damaged fuel assembly, having a lower plate provided with clamping means for releasably clamping said damaged fuel assembly in said first chamber,
- a second chamber for receiving a new skeleton devoid of end members, having an upper plate provided with clamping means for releasably clamping said new skeleton,
- repair means for receiving said first chamber and said second chamber in vertical alignment with each other, with said lower plate and upper plate in mutually adjacent relation,
- a rod transfer tool having gripping means insertable from a position above said second chamber into said first and second chambers for gripping one fuel rod at a time in said damaged fuel assembly and drawing said one fuel rod into said new skeleton, and
- mask means arranged for attachment to said upper plate at a position between said upper and lower plates, said mask means being formed with apertures for guiding said rod gripping means,
- wherein said upper plate, lower plate and mask have indexing means for mutually indexing said upper plate and said lower plate upon downward movement of said second chamber toward said first chamber.

5. An apparatus according to claim 1, further comprising at least one extra mask for guiding a tool for removing the end member of the assembly whose rods are to be extracted, said mask being provided with deenergizable means for centering and attaching said mask to the end member, and with columns for receiving a handling tool.

6. An apparatus according to claim 4, further comprising an inversion device for swinging any one of the chambers through 180°.

7. An apparatus according to claim 6, wherein said inversion device comprises a displaceable frame of adjustable height bearing two sets of rollers for receiving two half-shafts disposed in the centre of the chambers, and manually controlled means acting on at least one of the half-shafts to tilt the chamber.

8. An apparatus according to claim 4, wherein said lower plate has connection means for releasably connecting a chamber plug to said lower plate, said plug having slidable means co-operating with said lower plate for indexing said plug, said plug has abutment means for supporting a confronting head member of the damaged fuel assembly contained in the first chamber.

9. An apparatus for rebuilding a nuclear fuel assembly comprising a skeleton having two end members connected by tie rods attached to the end members and grids distributed between the end members along the tie rods and adapted to retain a cluster of fuel rods located between the end members, comprising:

- a first chamber for receiving a fuel assembly, comprising means for securely retaining the assembly in said first chamber, while permitting removal of one of the end members of said fuel assembly,
- a second chamber for receiving a new fuel assembly skeleton identical to the skeleton of said assembly in the first chamber but without end members, said second chamber having means for temporarily immobilizing the new fuel assembly skeleton,
- a repair station comprising lift means for receiving said first chamber and second chamber in vertical alignment with each other, and for bringing the chambers to a level such that there subsists a layer of protective water above the fuel rods, and
- a rod transfer tool means for drawing one fuel rod at a time into the new fuel assembly skeleton from the assembly contained in the first chamber,
- wherein said first first chamber has a first plate at an end thereof, said plate receiving a detachable plug having a first member for axially clamping said fuel assembly, said first member being displaceable axially by means of a remote control tool for retaining the assembly when the first chamber is in an inverted position, and
- wherein said second chamber has a second plate at an end thereof, said second plate receiving a detachable plug having a second member for axially clamping said new fuel assembly skeleton, said second member being displaceable axially by means of a remote control tool for retaining said new fuel assembly skeleton.

* * * * *

UNITED STATES PATENT AND TRADEMARK OFFICE
CERTIFICATE OF CORRECTION

PATENT NO. : 4,724,607
DATED : February 16, 1988
INVENTOR(S) : Beuneche et al

It is certified that error appears in the above-identified patent and that said Letters Patent is hereby corrected as shown below:

On the title page second inventor's name should read

--Pierre Amiet--,

Signed and Sealed this

Fourteenth Day of March, 1989

Attest:

DONALD J. QUIGG

*Attesting Officer*    *Commissioner of Patents and Trademarks*